(12) United States Patent
Chandrasekharan et al.

(10) Patent No.: US 10,078,151 B2
(45) Date of Patent: Sep. 18, 2018

(54) METHOD FOR DETECTING AND IDENTIFYING NUCLEAR MATERIAL IN A CONTAINER AND RADIATION MONITORING ARRANGEMENT FOR CONDUCTING THE METHOD

(71) Applicant: Arktis Radiation Detectors Ltd., Zurich (CH)

(72) Inventors: Rico Chandrasekharan, Zurich (CH); David Murer, Zurich (CH); Ulisse Gendotti, Zurich (CH); Giovanna Davatz, Zurich (CH)

(73) Assignee: Arktis Radiation Detectors Ltd., Zurich (CH)

( * ) Notice: Subject to any disclaimer, the term of this patent is extended or adjusted under 35 U.S.C. 154(b) by 177 days.

(21) Appl. No.: 13/913,966

(22) Filed: Jun. 10, 2013

(65) Prior Publication Data
US 2014/0361186 A1 Dec. 11, 2014

(51) Int. Cl.
*G01V 5/00* (2006.01)
*G01T 3/00* (2006.01)
*G01T 3/06* (2006.01)

(52) U.S. Cl.
CPC ............ *G01V 5/0075* (2013.01); *G01T 3/00* (2013.01); *G01T 3/06* (2013.01); *G01V 5/0091* (2013.01)

(58) Field of Classification Search
None
See application file for complete search history.

(56) References Cited

U.S. PATENT DOCUMENTS

| 4,509,042 A | 4/1985 | Kruse |
| 2009/0033487 A1* | 2/2009 | McFadden ............. G01T 1/169 340/540 |
| 2009/0074128 A1 | 3/2009 | Bertozzi et al. |

(Continued)

FOREIGN PATENT DOCUMENTS

WO 2013068032 A1 5/2013

OTHER PUBLICATIONS

Forman et al., "Fast neutron source detection at long distances using double-scatter spectroscopy," Proc. SPIE 5198, Hard X-ray and Gamma-Ray Detector Physics V, 217 (Jan. 20, 2004); Retrieved from internet [May 4, 2015]; Retrieved from url<http:proceedings.spiedigitallibrary.org/proceeding.aspx?articleid=826079>.*

(Continued)

*Primary Examiner* — Yara B Green
(74) *Attorney, Agent, or Firm* — The Webb Law Firm

(57) ABSTRACT

The invention relates to an improved method for detecting and possibly identifying and/or characterizing nuclear and/or radiological material in a container, vehicle, or on a person, comprising the steps of: a. providing at least one detector, which is capable of detecting radiation events being interrelated to nuclear or radiological material; b. bringing the at least one detector in the vicinity of the container, vehicle or person to be monitored; c. detecting radiation events being interrelated to the container, vehicle or person to be monitored; d. assigning each detected radiation event an individual time stamp in order to generate a time pattern of the detected radiation events; and e. analyzing the time pattern with respect to time correlation structures in order to identify a presence and/or characteristics of the nuclear or radiological material.

28 Claims, 14 Drawing Sheets

(56) References Cited

U.S. PATENT DOCUMENTS

| | | | | |
|---|---|---|---|---|
| 2010/0332145 A1* | 12/2010 | Rowland | ............... | G01T 3/00 702/22 |
| 2011/0024635 A1* | 2/2011 | Shah | ............... | G01T 1/202 250/362 |
| 2011/0101230 A1* | 5/2011 | Inbar | ............... | G01T 1/167 250/370.05 |
| 2011/0215253 A1 | 9/2011 | Van Bree et al. | | |
| 2014/0042330 A1* | 2/2014 | Gozani | ............... | G01T 1/203 250/367 |

OTHER PUBLICATIONS

Ensslin, "Principles of Neutron Coincidence Counting," Passive Nondestructive Assay of Nuclear Materials, Chapter 16, 1991, pp. 457-490.

Enqvist et al., "A combined neutron and gamma-ray multiplicity counter based on liquid scintillation detectors," Nuclear Instruments and Methods in Physics Research A (2010), 4 pages, doi:10.1016/j.nima.2010.10.071.

Bauer, Florian, Zhang, Nan, Schmand, Matthias, Loope, Michael, Eriksson, Lars, and Aykac, Mehmet; "Dynode-Timing Method for PET Block Detectors", IEEE Transactions on Nuclear Science, IEEE Service Center, New York, NY, US, vol. 54, No. 1, (Feb. 1, 2008).

Clarke, S.D., Flaska, M., Pozzi, S.A., and Peerani, P.; "Neutron and gamma-ray cross-correlation measurements of plutonium oxide powder", Nuclear Instruments & Methods in Physics Research, Section A: Accelerators, Spectrometers, Detectors, and Associated Equipment, Elsevier BV, North-Holland, NL, vol. 604, No. 3, (Jun. 11, 2009).

Dolan, Jennifer L., Flaska, Marek, Pozzi, Sara A., and Chichester, David L.; "Nuclear Nonproliferation Measurements Performed on Mixed-Oxide Fuel Pins at the Idaho National Laboratory"; 2009 IEEE Nuclear Science Symposium and Medical Imaging Conference, Orlando, FL, US (Oct. 24, 2009).

\* cited by examiner

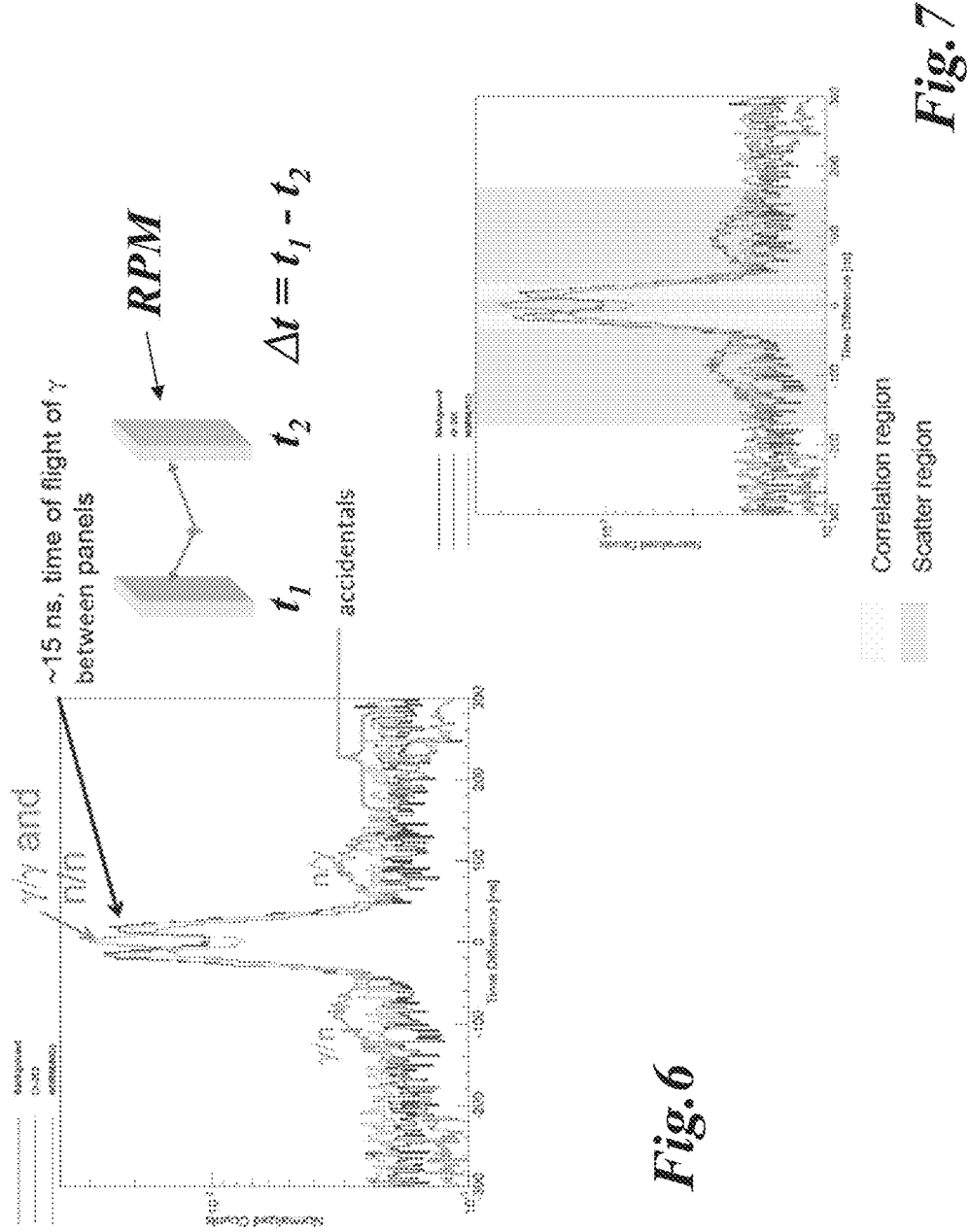

Source: Ely et al, "The use of energy windowing to discriminate SNM from NORM in radiation portal monitors, NIM A, Vol. 560, 2006)

METHOD FOR DETECTING AND IDENTIFYING NUCLEAR MATERIAL IN A CONTAINER AND RADIATION MONITORING ARRANGEMENT FOR CONDUCTING THE METHOD

BACKGROUND OF THE INVENTION

The present invention relates to technologies used especially for homeland security applications to prevent radiological terrorism. It relates especially to a method to passively detect radiological threats such as shielded special nuclear material, and to discern these from more benign sources of radiation such as Naturally Occurring Radioactive Materials (NORM), medical isotopes, and natural backgrounds. It refers to a method for detecting and possibly identifying and/or characterizing nuclear and/or radiological material in a container, vehicle, or on a person according to the preamble of claim 1.

It further refers to a radiation monitoring arrangement for conducting said method.

PRIOR ART

Radiation portal monitors (RPM) are systems that passively detect ionizing radiation, with the goal to interdict illicit transports of radiological and nuclear materials (see for example document U.S. Pat. No. 4,509,042). Often, RPMs contain detectors capable of detecting photons and neutrons, such as PVT plastic scintillators and proportional counters sensitive to thermal neutrons. One of the challenges in the application of radiation portal monitoring is discerning threat materials, in particular shielded special nuclear materials (SNM) such as plutonium or highly enriched uranium (HEU), from more benign sources of radiation.

Threats that emit significant numbers of neutrons can be detected by using neutron counters to measure the neutron count rate; however, not all SNM emits sufficient neutrons for this to be reliable, particularly if the material is shielded.

A further method to distinguish threats from more benign sources is to analyze the spectrum of detected photons. While the characteristic lines of threat isotopes can be resolved with detector technologies such as high purity germanium, such technologies are often too costly for equipping RPMs. Lower resolution detectors, such as NaI or PVT, provide limited spectral information to carry out such distinction.

In the field of nuclear safeguards, multiplicity counting (N. Ensslin, Principles of Neutron Coincidence Counting, http://www.lanl.gov/orgs/n/n1/panda/00326411.pdf) is used to measure the quantity of fissile material in a mass of material consisting of fractions of fissile material, non-fissile radioactive material, and radiological inert material. The technique exploits the fact that in a fission process a multiplicity of neutrons is emitted simultaneously. Nuclear safeguard applications are different to portal monitoring applications in that the former tries to quantify amounts of fissile material for accounting purposes to prevent diversion from nuclear sites, while the latter aims at detecting illicit radioactive materials in a stream of goods in commerce. Nuclear safeguards applications are often installed around glove boxes, and often surround the sample. Portal monitors, on the other side, have much less solid angle coverage, being just a portal, where pedestrians, packages or vehicles pass through.

More recent efforts (A combined neutron and gamma-ray multiplicity counter based on liquid scintillation detectors, A. Enqvist, et al., Nucl. Instr. and Meth. A (2010), doi: 10.1016/j.nima.2010.10.071) have tried to exploit the fact that fission events also emit a multiplicity of gamma rays. Some of the challenges of exploiting gamma multiplicity are the fact that natural photon background radiation levels are high (making accidental coincidences more likely), and the coincident detection involving photons is not necessarily indicative of fission, as many non-fission sources emit coincident photons (for example Co-60) or a photon in coincidence with a neutron (for example AmBe).

A recent patent application by the inventors (WO 2013/068032 A1) suggested to exploit time correlation aspects, inspired by those used in nuclear safeguards, to the application of passive screening with RPMs. The patent application suggested the use of fast neutron detectors for this purpose. Unlike the thermal neutron detectors typically used in RPMs, fast neutron detectors can provide time resolution on the nanosecond time scale, allowing the measurement of time correlations between neutrons, and neutrons and photons, down to the nanosecond time scale.

SUMMARY OF THE INVENTION

A method according to the invention for detecting and possibly identifying or characterizing nuclear and/or radiological material in a container, vehicle, or on a person, which is part of a flow of traffic, goods, or pedestrians, and which is monitored, at places such as ports, border crossings, airports, nuclear facility perimeters, public events, public transport facilities, roads, bridges or tunnels, comprises the steps of:
  a) providing at least one detector, which is capable of detecting radiation events being interrelated to nuclear or radiological material;
  b) bringing said at least one detector in the vicinity of the container, vehicle or pedestrian to be monitored;
  c) detecting radiation events being interrelated to said container, vehicle or pedestrian to be monitored;
  d) assigning each detected radiation event an individual time stamp in order to generate a time pattern of the detected radiation events; and
  e) analyzing said time pattern with respect to time correlation structures in order to identify the presence and if possible characterize, the nuclear or radiological material.

Throughout this text, the word container denotes an object such as a car, pedestrian, box, or ship, which may or may not have radiological or nuclear material inside itself, or outside itself. According to an embodiment of the invention said at least one detector used is sensitive to photons in an energy range between about 40 keV and about 4 MeV, and/or fast neutrons in the energy range between about 100 keV and 3 MeV.

Especially, said at least one detector is a large area fast response radiation detector, especially with a sensitive area of 2000 cm$^2$, or more.

More specifically, said at least one detector is a PVT plastic scintillator or similar organic scintillator.

In this text the word PVT and plastic scintillator is used to denote a large area radiation detector with fast response; PVT being the most commonly used material. The detector can equally be a polystyrene or PET scintillator, or other organic scintillator.

According to another embodiment of the invention said at least one detector is part of an already existing radiation portal monitor or muon scattering tomography system.

Especially, said at least one detector comprises a scintillator and a photomultiplier tube, and in order to obtain the timing information of the detected radiation events a signal is directly taken from a dynode of said photomultiplier tube.

Especially, said at least one detector comprises a scintillator, and in order to obtain the timing information of the detected radiation events an optical signal is taken from the scintillator directly or via a light guide.

Especially, said at least one detector is connected to a signal processing unit, and the timing information of the radiation events is obtained by fitting an active or passive signal splitter device between said at least one detector of the radiation portal monitor and the signal processing unit.

Especially, the timing information from said at least one detector is directly fed to a time stamping unit or a time analysis unit.

Especially, the timing information from said at least one detector is fed to a time stamping unit or a time analysis unit after having been pre-processed by a signal processing unit of said radiation portal monitor According to a further embodiment of the invention, within the time analysis performed in step (e) the temporal distribution of the time stamps of detected radiation events during a measurement time is measured and compared with the temporal distribution of time stamps of radiation events expected when no threatening radiation source is present.

According to another embodiment of the invention, within the time analysis performed in step (e) detected correlated counts for accidental coincidences are corrected by measuring the amount of accidental coincidences, when no correlations from threatening radiation sources are expected.

According to even another embodiment of the invention, within the time analysis performed in step (e) detected correlated counts for accidental coincidences are corrected by measuring gross count rates of said at least one detector and relating this value to the number of accidental coincidences.

According to even another embodiment of the invention, within the time analysis performed in step (e) the shape of neutron gamma coincidence events is measured in the time difference region corresponding to the time of flight difference between neutrons and photons, which is around 100 ns for a 4 m wide portal, and is used to predict the energy spectrum of the neutrons, thereby characterizing the threat.

Furthermore, a key functionality may be discerning Co-60 (emitting two simultaneous gammas) from K-40.

Furthermore, said at least one detector may be a proportional counter.

Furthermore, the invention may exploit the phenomenon of muon induced fission, whereby the time of the entering muon is taken into account.

The radiation monitoring arrangement according to the invention for conducting the inventive method comprises at least one detector, which is capable of detecting radiation events being interrelated to nuclear or radiological material to be detected, a time stamping unit for assigning each detected radiation event of said at least one detector an individual time stamp, said time stamping unit having an input, which receives signals from said at least one detector, and an output being connected to a time analysis unit for analyzing a time pattern received from said time stamping unit with respect to time correlation structures. According to an embodiment of the invention said at least one detector is sensitive to photons in an energy range from about 40 keV to about 4 MeV, and/or is sensitive to fast neutrons in the energy range between about 100 keV and 3 MeV.

Especially, said at least one detector is a large area fast response radiation detector, especially with a sensitive area of 2000 cm$^2$, or more.

More specifically, said at least one detector (D1-D4) is a PVT plastic scintillator or similar organic scintillator.

According to another embodiment of the invention said at least one detector is part of a radiation portal monitor or muon scattering tomography system.

Especially, said at least one detector is connected within said radiation portal monitor to a signal processing unit.

More specifically, said at least one detector is directly connected the input of said time stamping unit.

More specifically, an output of said signal processing unit is connected to the input of said time stamping unit.

According to another embodiment of the invention the time analysis unit is connected to a time correlation alarm decision unit.

According to another embodiment of the invention said time stamping unit and said time analysis unit are contained in a box, and said box is arranged at a side of a radiation portal monitor.

BRIEF DESCRIPTION OF THE DRAWINGS

The present invention is now to be explained more closely by means of different embodiments and with reference to the attached drawings.

FIG. 6 shows in a diagram an actual measurement of the time differences between time stamps of PVT detectors located on opposing sides of a lane in an RPM-type geometry;

FIG. 7 shows in a diagram a possible embodiment of the time analysis unit, wherein time correlation regions characteristic of threat sources are identified (blue shading) and the contributions therein measured; regions where background and NORM have increased contributions, in this case shaded green, are also identified;

DETAILED DESCRIPTION OF DIFFERENT EMBODIMENTS OF THE INVENTION

The present invention seeks to simplify the concepts promoted in WO 2013/068032 A1, and make them more easily applicable to radiation portal monitoring.

A novel aspect with respect to WO 2013/068032 A1 is to not require a separate set of detectors for triggering: The present invention exploits the self-correlation of radiation events detected by detectors of a given detector type. The time pattern at which radiation is detected is studied, and used to inform a decision as to whether a threat or a more benign source is being measured.

Applied to radiation portal monitoring, this technique works well with PVT plastic scintillators: Compared to other detector materials, PVT is relatively inexpensive, allowing the fabrication of cost effective large area detector systems suitable for RPMs.

Furthermore, PVT is sensitive not just to photons, but even more so to fast neutrons in the energy range between about 75 keV and 3 MeV, the peak emission of fission neutrons. The fast-neutron sensitivity of PVT is not exploited in conventional RPMs due to the fact that large area PVT detectors do not allow distinguishing fast neutron events from the three orders of magnitude more prevalent photon events.

In the present invention, however, the time structure of detected events is studied. As such, the PVT detectors of RPMs allow detecting time correlations between all forms of detected radiation events irrespective of their nature, with fast neutrons contributing to the signature of time correlated events. Increased time correlations on defined time scales indicate the presence of a threat source such as fissioning SNM.

Especially, the present invention can be implemented as an upgrade to existing RPMs: The time stamp of detected radiation events is obtained from the already in place detectors of conventional RPMs. Based on these time stamps, the time correlation structure of the detected radiation is analyzed and used to inform an alarm status decision. This decision may be made based on time-correlation-structure alone, or as a result of the data fusion of the timing information data stream with other data streams such as for example neutron count rate data, gamma count rate data, gamma energy window count rate data.

The upgrade of existing RPMs with this invention can be performed in several ways that require only minimal modification of the original system. In one embodiment of the invention, an RPM containing scintillators is upgraded obtaining the timing information from each scintillator by branching a signal lead off a dynode of the photomultiplier tubes, thereby not significantly affecting the original functioning of the RPM (see FIG. 3).

In another embodiment, the timing information is obtained via induction caused by the original electrical signal in a separate signal lead used for this invention.

Figure 1:
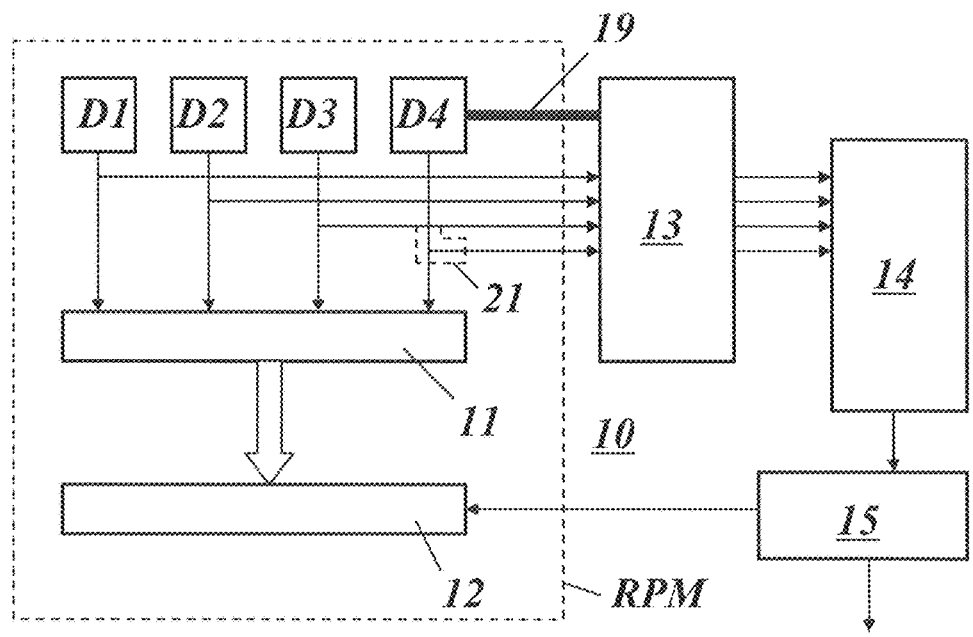
FIG. 1 shows a radiation monitoring arrangement according to an embodiment of the invention, with four detectors being part of an existing radiation portal monitor, and being directly connected to a time stamping unit.

In a further embodiment, the timing information is obtained by fitting an active or passive signal splitter device (21 in FIG. 1) between detectors D1-D4 in FIG. 1) of the RPM and the signal processing elements (signal processing unit 11 in FIG. 1) of the RPM, thereby supplying the timing information necessary for this invention. Alternatively, a light detector may be attached to the scintillator, directly or via light guide (19 in FIG. 1), to provide this information.

Figure 2:
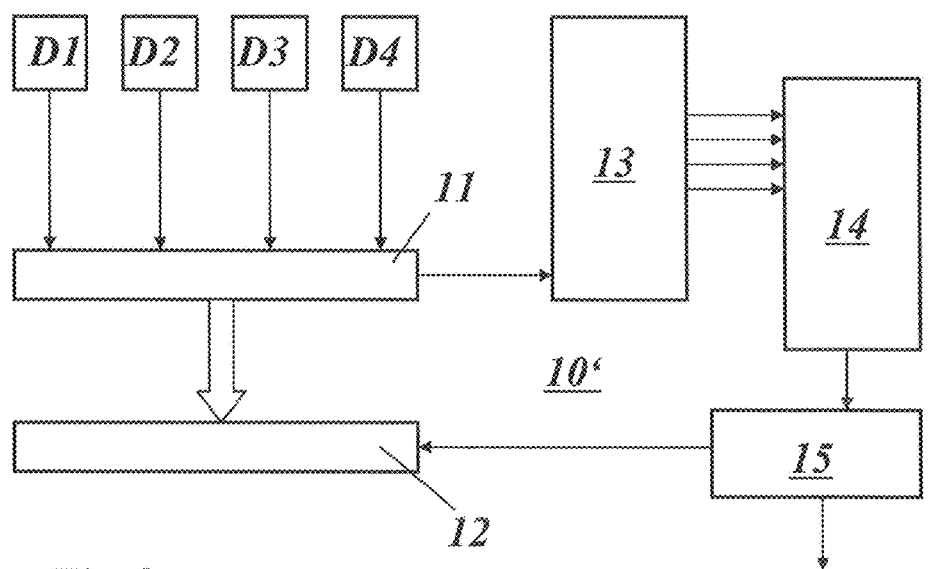
FIG. 2 shows a radiation monitoring arrangement according to another embodiment of the invention, with four detectors being part of an existing radiation portal monitor, and being connected to a time stamping unit via a signal processing unit.

In another embodiment of the invention, the timing information is provided to a time stamping unit (13 in FIG. 1), or directly to the time analysis unit (14 in FIG. 1), after pre processing by a signal processing unit of the RPM (see FIG. 2). This may be in digital or in analogue form.

The time analysis performed by the time analysis unit 13 of in the invention will compare the time stamps of detected radiation events, and measure the temporal distribution of these time stamps during a measurement with the temporal distribution of time stamps of radiation events expected when no threat source is present. Most benign sources such as for example K-40, emit radiation in a completely random manner, leading to a Poissonian distribution of time stamps. Many threat sources, including fission sources and Co-60, emit time-correlated radiation. Furthermore the interaction of the radiation emitted by fission sources with surroundings (e.g. shielding, containers, nearby objects) can cause the emission of time-correlated radiation.

In an embodiment of the invention, the time analysis unit 14 will search for time stamps of radiation events lying within certain time separation windows.

In a preferred embodiment of this invention, these time windows will be 0-10 ns to account for simultaneously emitted photons, and tens of nanoseconds to several hundred nanoseconds to account for neutrons emitted together with photons, whereby a photon is detected before the neutron due to the difference in time of flight. A time window beyond hundreds of nanoseconds may be used to account for secondary effects such as neutron radiative capture and induced fission. Time windows proportional to the time of flight of photons between the detectors may be excluded from the analysis or used for normalization, as may other time windows that would not show an excess number of correlated counts in the presence of threat sources.

In an embodiment of the invention, the time analysis unit 14 will correct the detected correlated counts for accidental coincidences by measuring the amount of accidental coincidences where no correlations from threat sources are expected. In another embodiment of the invention, the time analysis unit corrects the detected counts for accidental coincidences by measuring the gross count rates of the detectors, and relating this value to the number of accidental coincidences.

FIG. 1 shows one embodiment of a radiation monitoring arrangement according to the invention. Within the radiation monitoring arrangement 10 of FIG. 1 a plurality of detectors D1-D4 of an (already existing) RPM provide signals to the RPM's signal processing unit 11. This in turn provides information to an alarm decision unit 12, which sets an alarm if the input provided by the RPM signal processing unit fulfils a given set of requirements. In this invention, the timing information of the detectors is also provided to a time stamping unit 13, capable of accurately measuring the time of detected radiation events. In some embodiments of this invention the input to the time stamping unit is analogue and the output is digital. The output of the time stamping unit is 13 passed on to a time analysis unit 14. The time analysis unit 14 measures the presence of particular patterns in the time stamp data and outputs the measurement results in the form of one or more time correlation parameters. A time correlation alarm decision unit 15 sets an alarm if the time correlation parameters fulfil a given set of requirements. This alarm is then expressed directly, or the decision information is passed back to the RPM alarm decision unit 12. In some embodiments of the invention, the time correlation parameters may be passed directly to the RPM alarm decision unit 12. Each of the time related units (the time stamping unit 13, the time analysis unit 14, and the time correlation alarm decision unit 15) may be physically located inside the RPM's enclosure, in a box (20 in FIG. 4) attached to the RPM, or at a distance to the RPM.

In another embodiment of the invention shown in FIG. 2, the timing information of the detectors D1-D4 is provided after undergoing some degree of pre-processing in the signal processing unit 11. The data may be provided by several data channels or in collated form, and may be in analogue or digital form. In the latter case, the timing data may be directly passed to the time analysis unit 14.

Figure 3:
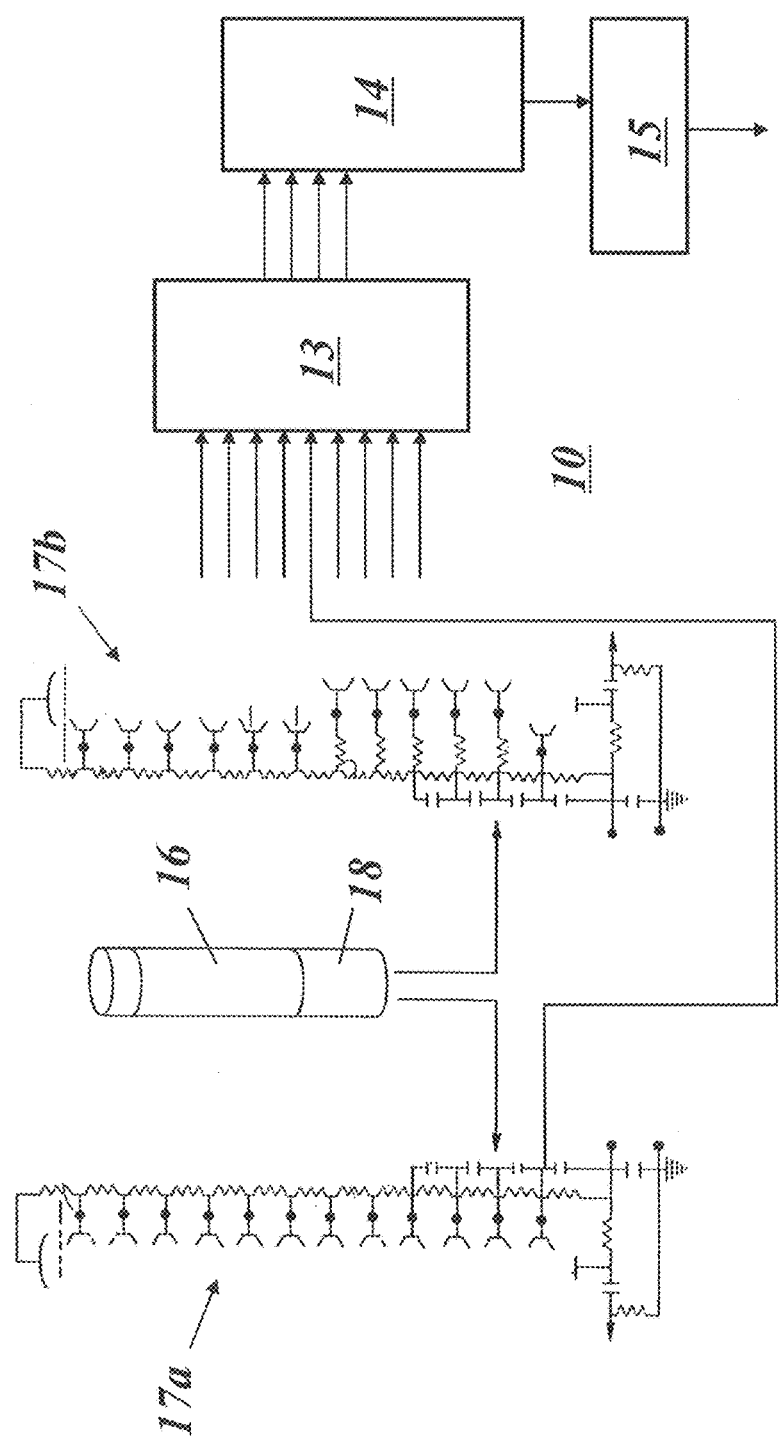
FIG. 3 shows one possible way to obtain a timing signal from detectors without disrupting the signals and possibly the original functioning of the existing radiation portal monitor by obtaining the timing signal directly off a dynode of the detector's photomultiplier tubes.

According to FIG. 3 one possible way to obtain a timing signal from detectors D1-D4 without disrupting the RPM signals and possibly its original functioning, is to obtain the timing signal directly off a dynode of the detectors' photo multiplier tubes 16 (sitting in a base and being connected to tube circuits 17a,b (see FIG. 2a of U.S. Pat. No. 4,509,042).

Alternatively, the signal may be obtained by simple use of a T-piece in the signal cable, or by means of an active or passive splitter (21 in FIG. 1). Other embodiments may use capacitive electrical induction to obtain a timing signal, or use a separate light sensor (19 in FIG. 1) attached directly or indirectly to the scintillator.

Figure 4:
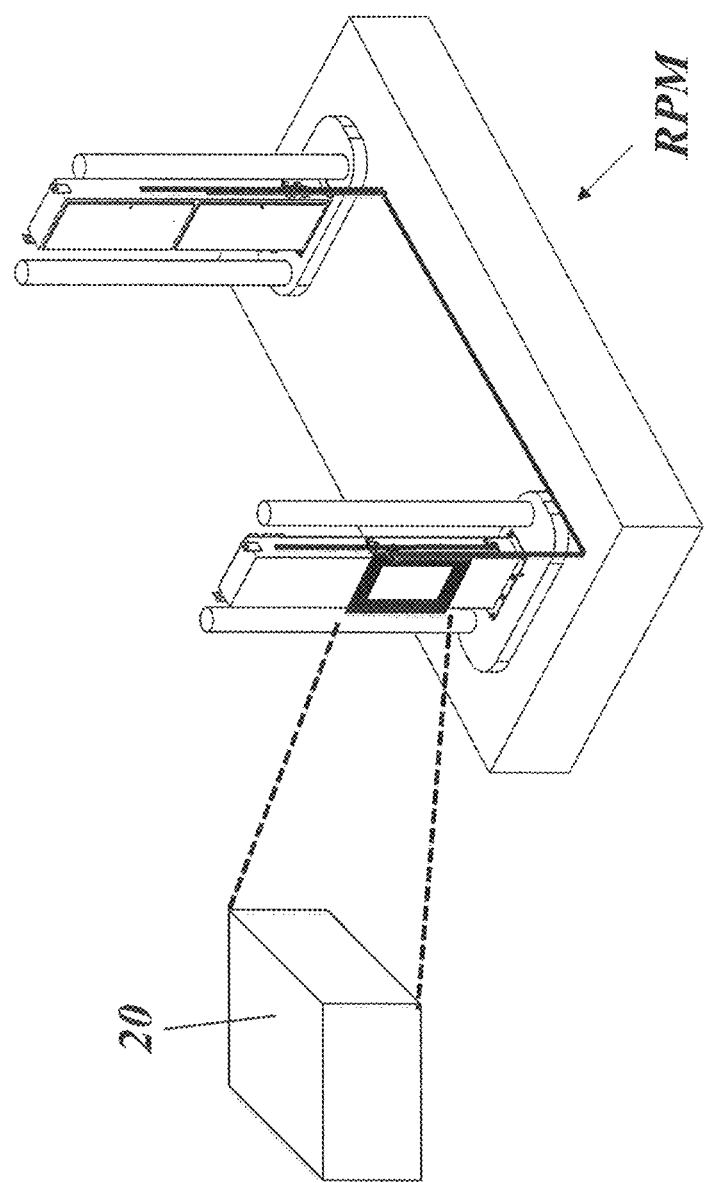
FIG. 4 shows an embodiment of the invention in the form of an upgrade to an existing radiation portal monitor (RPM), whereby timing signals from the RPM's detectors are passed to a time stamping unit, time analysis unit, and alarm decision unit, located within a box attached to the RPM.

According to FIG. 4 a possible embodiment of the invention is in the form of an upgrade to existing RPMs. From the RPM's detectors, timing signals are passed to the invention's time stamping unit 13, time analysis unit 14, and alarm decision unit 15, located within a box 20 attached to the RPM. Information is then passed back to the RPM's controller containing the RPM's alarm decision unit 12.

Figure 5:
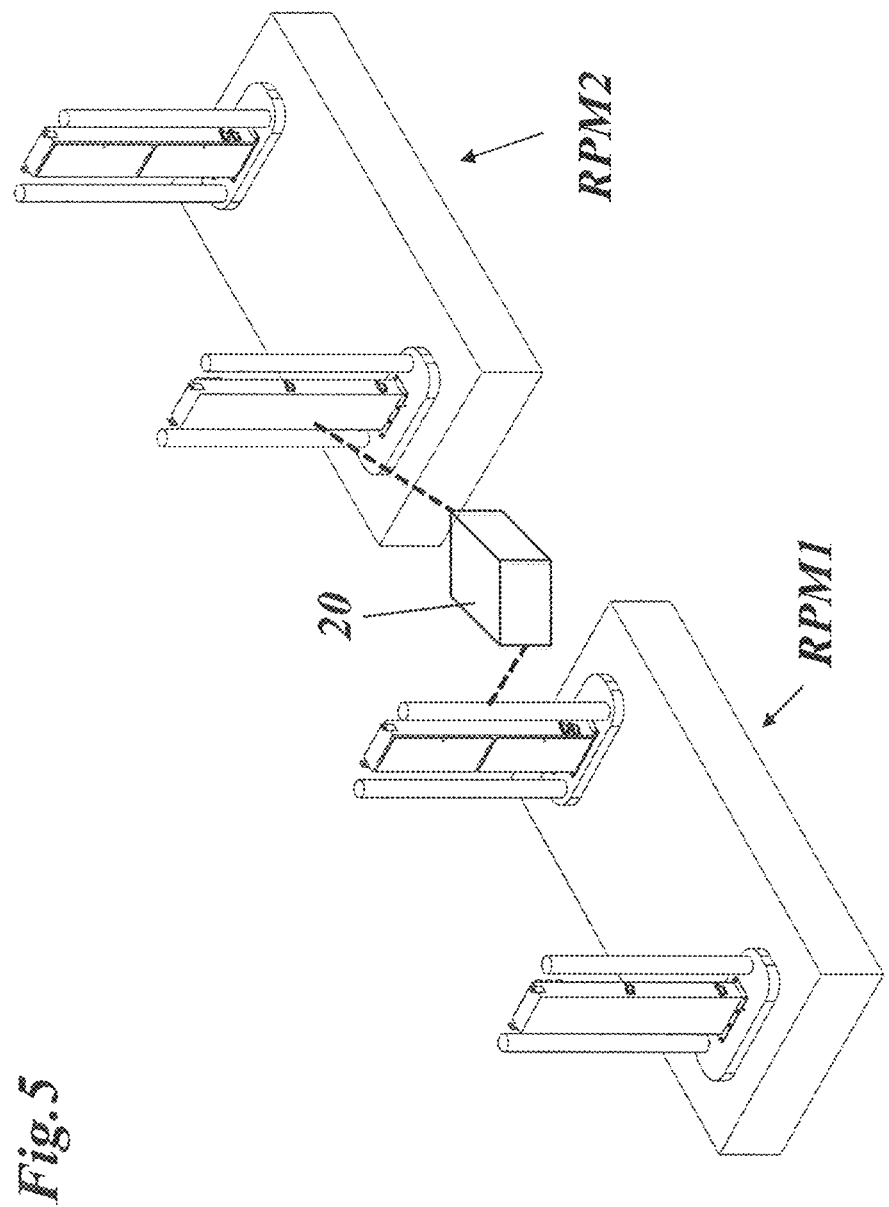
FIG. 5 shows another embodiment of the invention in the form of an upgrade simultaneously to two existing radiation portal monitors (RPMs) located within close proximity to each other, whereby the time stamping and time analysis unit are then located inside one of the RPMs or in a separate box.

According to FIG. 5 another possible embodiment of the invention is the form of an upgrade simultaneously to two or more RPMs. In FIG. 5 RPM1 and RPM2 are located within close proximity to each other. The invention's time stamping and time analysis unit 13 and 14 is then located inside one of the RPM or in a separate box 20, timing signals are passed to the inventions time stamping unit 13 by means of a cable (dotted lines in FIG. 5).

FIG. 6 shows actual measurements of the time differences between time stamps of PVT detectors located on opposing sides of a lane in an RPM-type geometry. This data is provided by the time stamping unit 13 to the time analysis unit 14. The red curve, measured in the presence of a fission source, shows a sharp peak centred around zero time difference, caused primarily by simultaneously emitted photons. The height of the peak is further increased by a contribution of simultaneously emitted neutrons. The same measurement also exhibits broader peaks at time differences around ±100 ns, arising from neutrons emitted with photons, the time difference arising from the difference in time of flight. The black curve shows a measurement of natural background. The sharp central peak is missing. Shoulders corresponding to the time of flight across the lane, in the case of this measurement about 15 ns, are caused primarily by Compton scatters of photons from one detector across the lane into the other. At time differences greater than 90 ns, a constant background of "accidental" coincidences, is caused by chance detection of unrelated radiation at that time difference. The green curve shows a measurement of Naturally Occurring Radioactive Material (NORM), in this case KCl, exhibiting a similar structure to background, but with a higher rate of accidental coincidences, easily explained by the in general higher rate of detection events.

The plot of FIG. 7 illustrates a possible embodiment of the time analysis unit: Time correlation regions characteristic of threat sources are identified (blue shading) and the contributions therein measured. Regions where background and NORM have increased contributions, in this case shaded green, are also identified. These regions may be used for normalization purposes, as may the regions dominated by "accidentals".

In another embodiment of this invention, the time analysis unit 14 measures the shape of the neutron gamma coincidence events in the time difference region around 100 ns and uses this to predict the energy spectrum of the neutrons, thereby characterizing the threat.

In another embodiment of this invention, the time analysis unit 14 measures parameters such as the "height" of the number of counts at the point t=0, the "height" of the shoulders corresponding to the time-of-flight between detectors, and the flatness and/or height of the distribution of accidental coincidences at larger time differences, and uses the absolute values and or ratios of these values to determine the type of source and/or its position.

Figure 8:
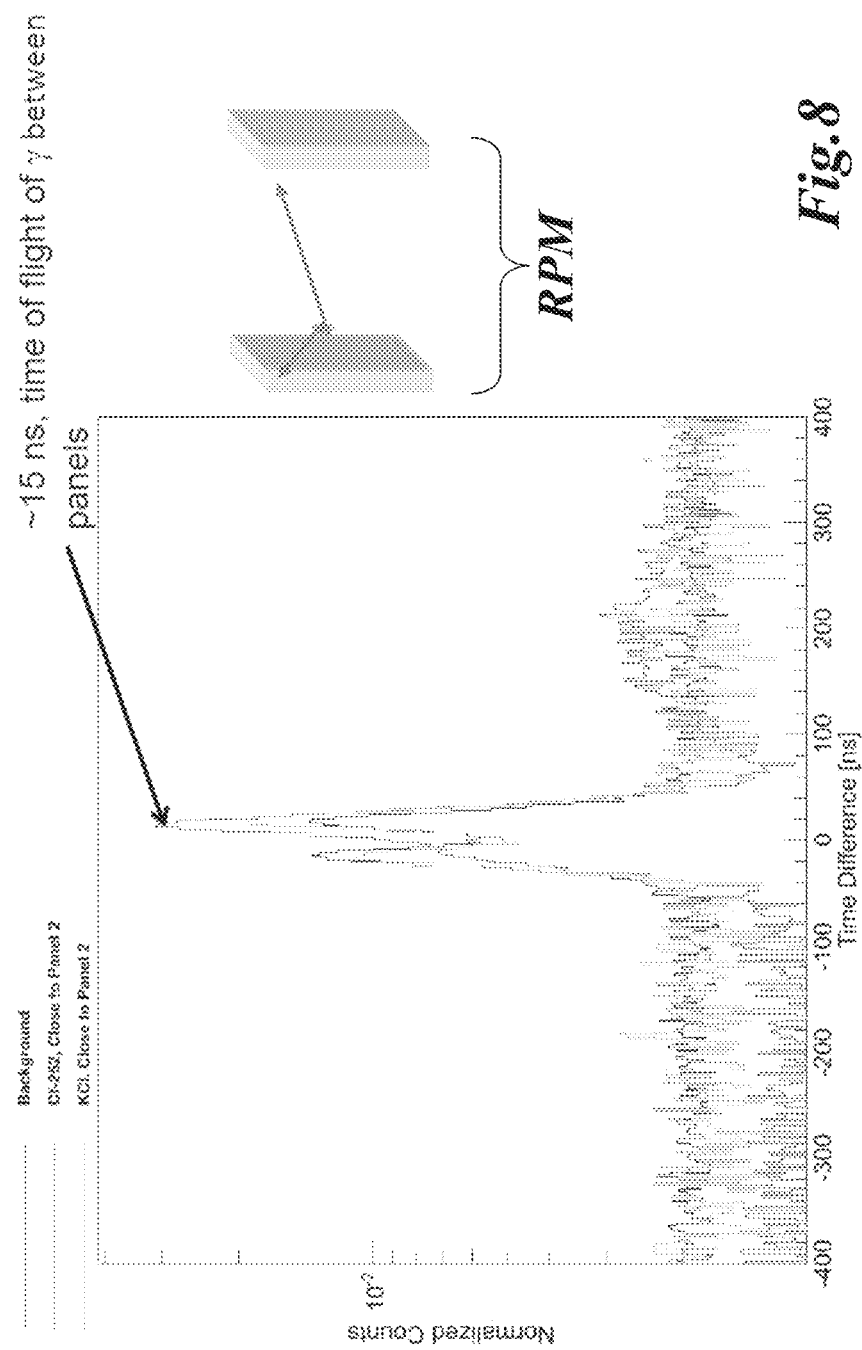
FIG. 8 shows that the time analysis is feasible also when sources are not centred, and can actually be used to extract information regarding the position and possibly even extension (point like or spread out) of the source; the green curve shows a measurement of a NORM source placed closer to one side of the RPM. The location of the time-of-flight shoulders is unaffected, but their relative intensities are changed, enabling the localization of the source; the red curve shows a measurement of a fission source placed closer to one side.

FIG. 8 shows that the time analysis is feasible also when sources are not centred, and can actually be used to extract information regarding the position and possibly even extension (point like or spread out) of the source. The green curve shows a measurement of a NORM source placed closer to one side of the RPM. The location of the time-of-flight shoulders is unaffected, but their relative intensities are changed, enabling the localization of the source. The red curve shows a measurement of a fission source placed closer to one side. The formerly centred peak is shifted, but remains closer to the centre than the time-of-flight shoulder. The neutron gamma peak is faint on one side, and very prominent on the other side.

In an embodiment of the invention, the analysis of the intensities, allows determination of the position and extension of sources, possibly supported by template fitting algorithms.

Figure 9:
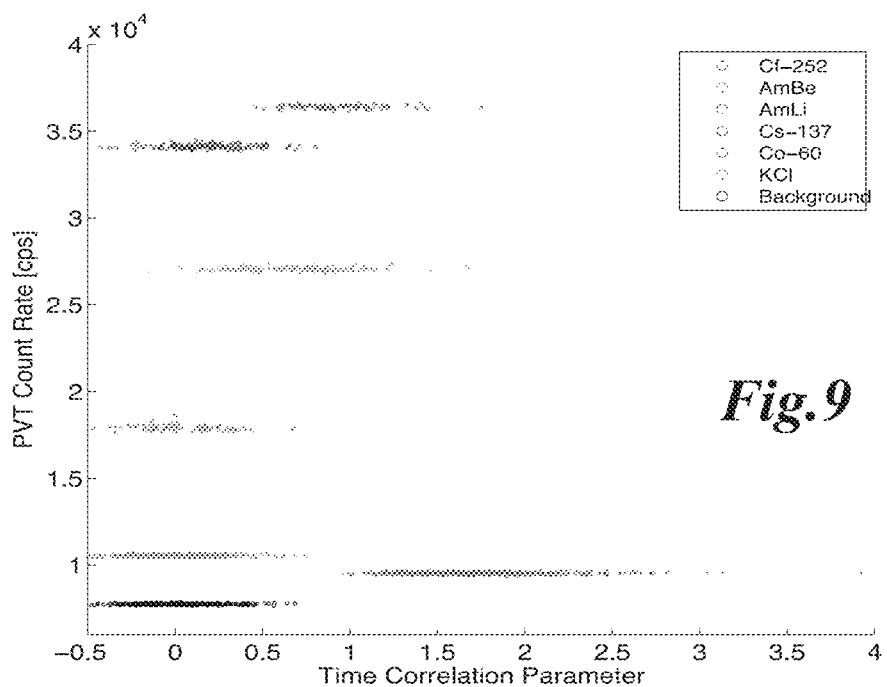
FIG. 9, 10 show actual measurements of different sources; the x-axes show the time correlation parameter as obtained by the time analysis unit; the y-axis of FIG. 9 shows the total count rate of the PVT detectors, which in most cases is a representative measure for the photon detection rate; the y-axis of FIG. 10 shows the neutron count rate measured by neutron detectors of an RPM.

FIG. 9 shows an actual measurement of different sources. The x-axes show the time correlation parameter as obtained by the time analysis unit 14. The y-axis of the plot shows the total count rate of the PVT detectors, which in most cases is a representative measure for the photon detection rate. It can be seen that fission sources (such as Cf-252) have an elevated time correlation parameter. Also, Co-60 has an elevated time correlation parameter, allowing its distinction from sources such as K-40.

Figure 10:
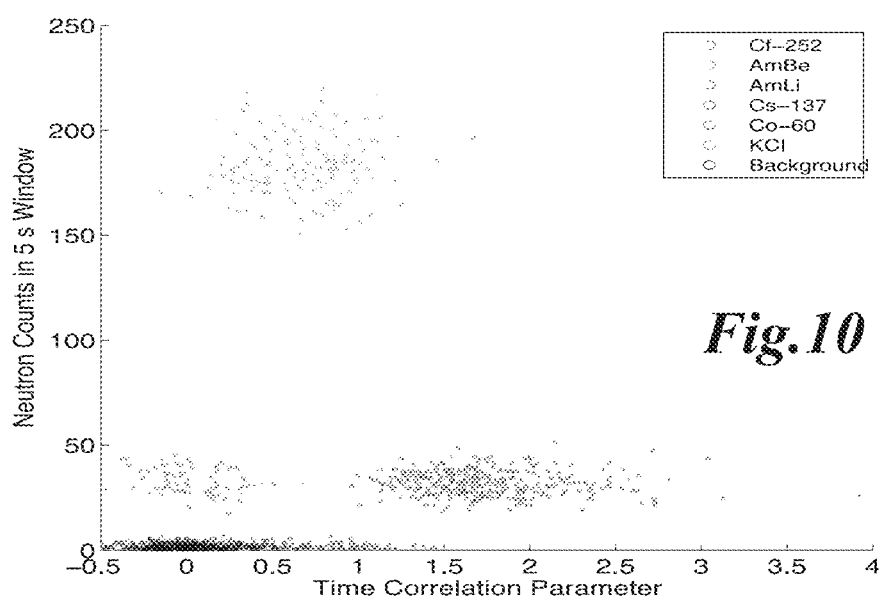

In FIG. 10, the y-axis of the plot shows the neutron count rate measured by neutron detectors of an RPM. It can be seen that the time correlation parameter supplied by the time analysis unit 14 of this embodiment of the invention is independent of both photon (see FIG. 9) and neutron (FIG. 10) detection rates, and thus is an orthogonal, independent measurement variable.

Figure 11:
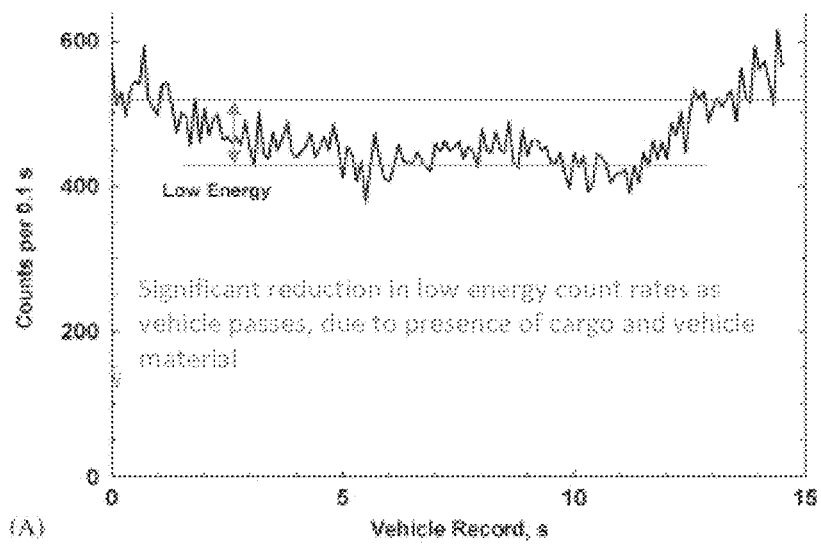
FIG. 11 shows that, while conventional RPMs suffer of an effect called baseline depression, caused by the shadow shielding of natural background by the vehicle being measured, and resulting in a lower count rate when a vehicle, container, cargo or other radiation attenuating materials are placed near the detectors, the system according to the present invention is less susceptible to this effect.

According to FIG. 11 conventional RPMs suffer of an effect called baseline depression, caused by the shadow shielding of natural background by the vehicle being measured. This effect results in a lower count rate when a vehicle, container, cargo or other radiation attenuating materials are placed near the detectors. The present invention is less susceptible to this effect. In an embodiment of this invention, the time analysis unit 14 fuses information of the total gross count rate with the time stamp unit to adapt the alarm criteria to the gross count information.

Figure 12:
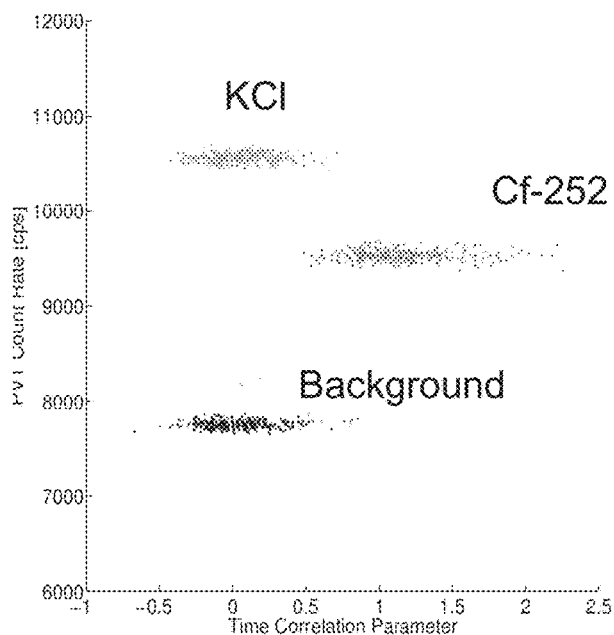
FIG. 12 shows a plot of actual measurements showing how this invention can discern NORM and medical isotopes from fission sources, even if the former emit more radiation than the latter.

In FIG. 12, a plot of actual measurements shows how this invention can discern NORM and medical isotopes from fission sources, even if the former emit more radiation than the latter.

Figure 13:
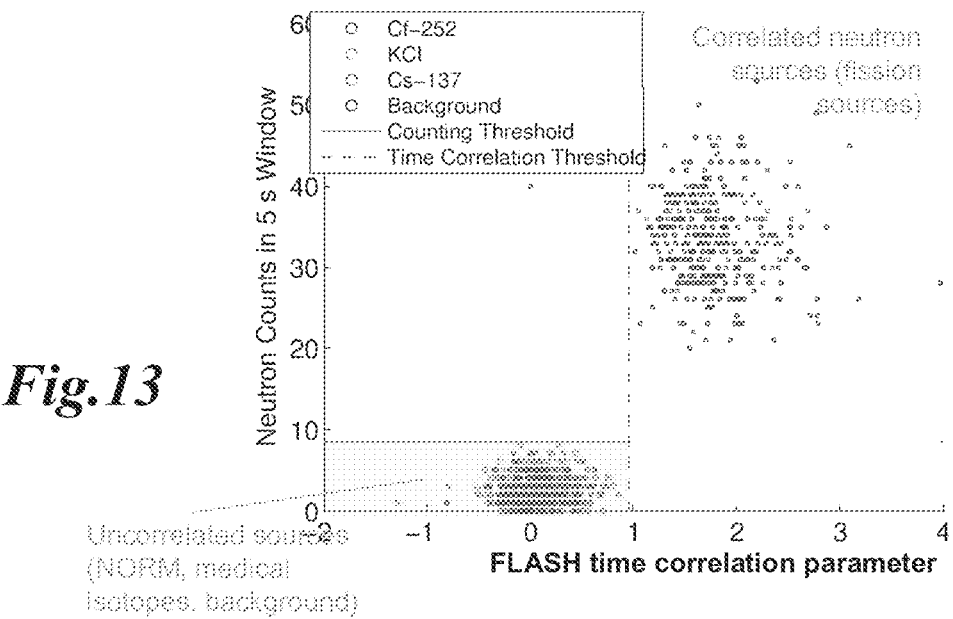
FIG. 13 shows a plot of actual measurements showing how this invention can discern correlated gamma sources such as Co-60 from NORM and medical isotopes as well as from fission sources.

In FIG. 13, a plot of actual measurements shows how this invention can discern correlated gamma sources such as Co-60 from NORM and medical isotopes as well as from fission sources.

Figure 14:
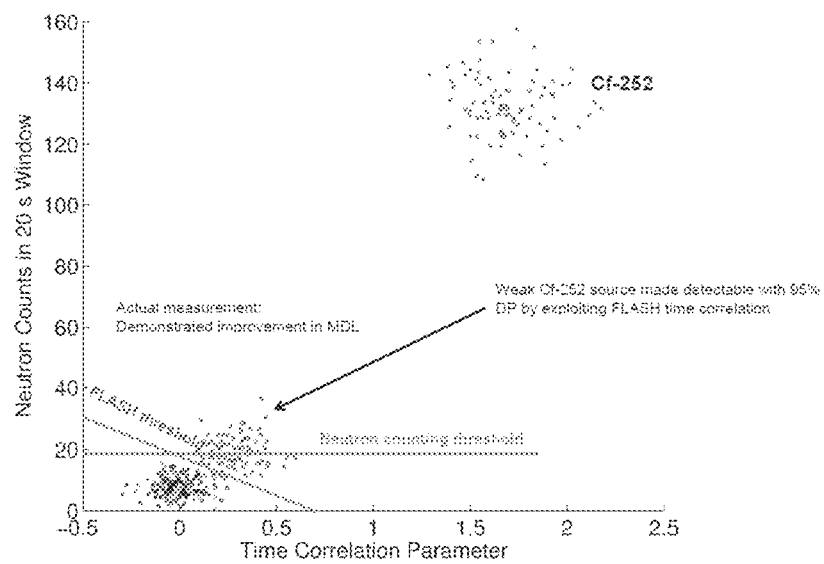
FIG. 14 shows a plot of actual measurements showing how this invention can improve the detectability of weak fission sources using a data fusion approach of conventional data streams (in this embodiment neutron count rate) with time correlation data.

In FIG. 14, a plot of actual measurements shows how this invention can improve the detectability of weak fission sources using a data fusion approach of conventional data streams (in this embodiment neutron count rate) with time correlation data.

Figure 15:
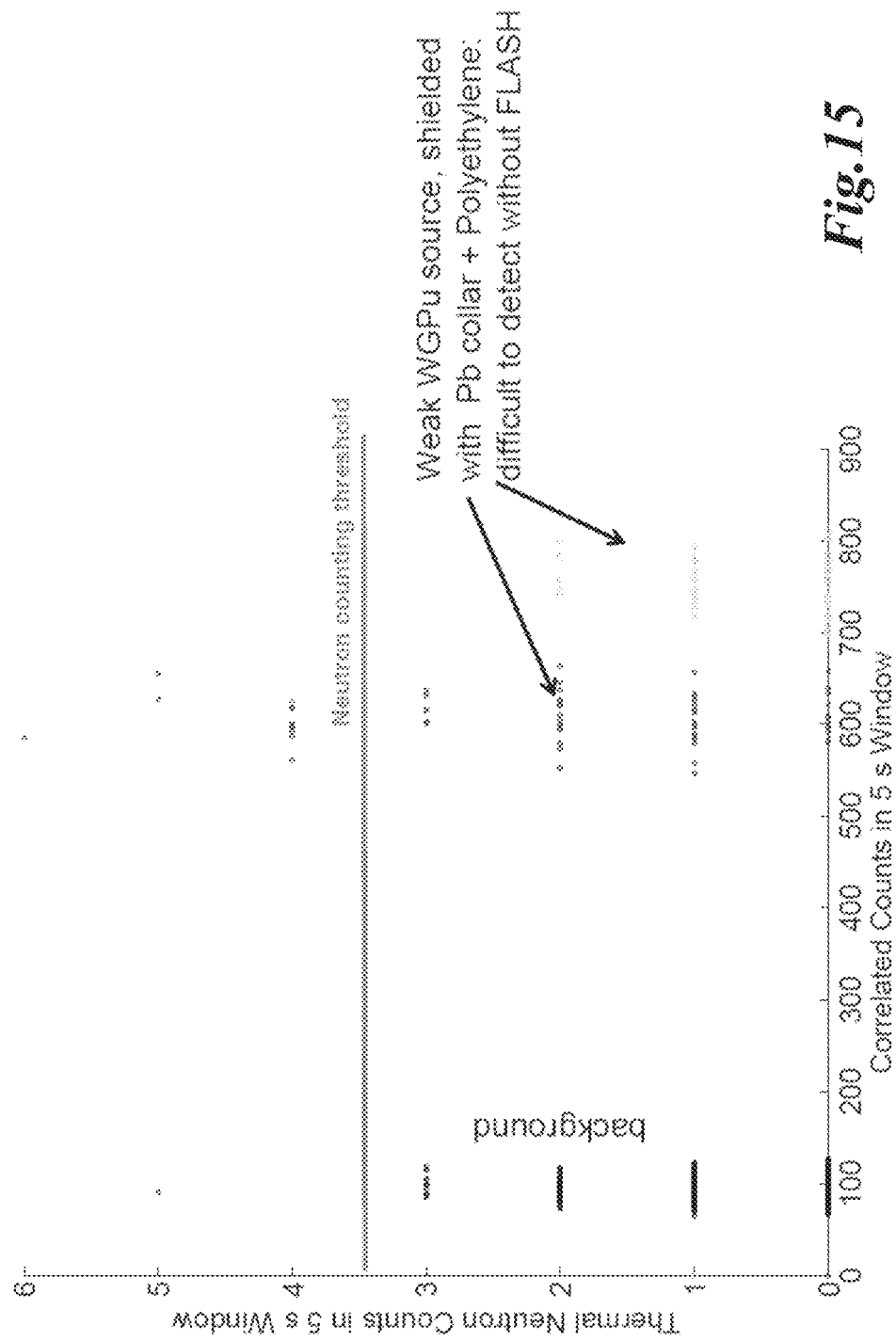
FIG. 15 shows a plot of actual measurements showing how this invention can make otherwise undetectable sources detectable; plot shows measurements of a sample of weapons grade plutonium shielded by lead and substantial amounts of neutron shielding, such that the sample's neutron signature remains below the natural background count rate; time stamp analysis makes this sample detectable.

In FIG. 15, a plot of actual measurements shows how this invention can make otherwise undetectable sources detectable. The plot shows measurements of a sample of weapons grade plutonium shielded by lead and substantial amounts of neutron shielding, such that the sample's neutron signature remains below the natural background count rate. Time stamp analysis makes this sample detectable.

Figure 16:
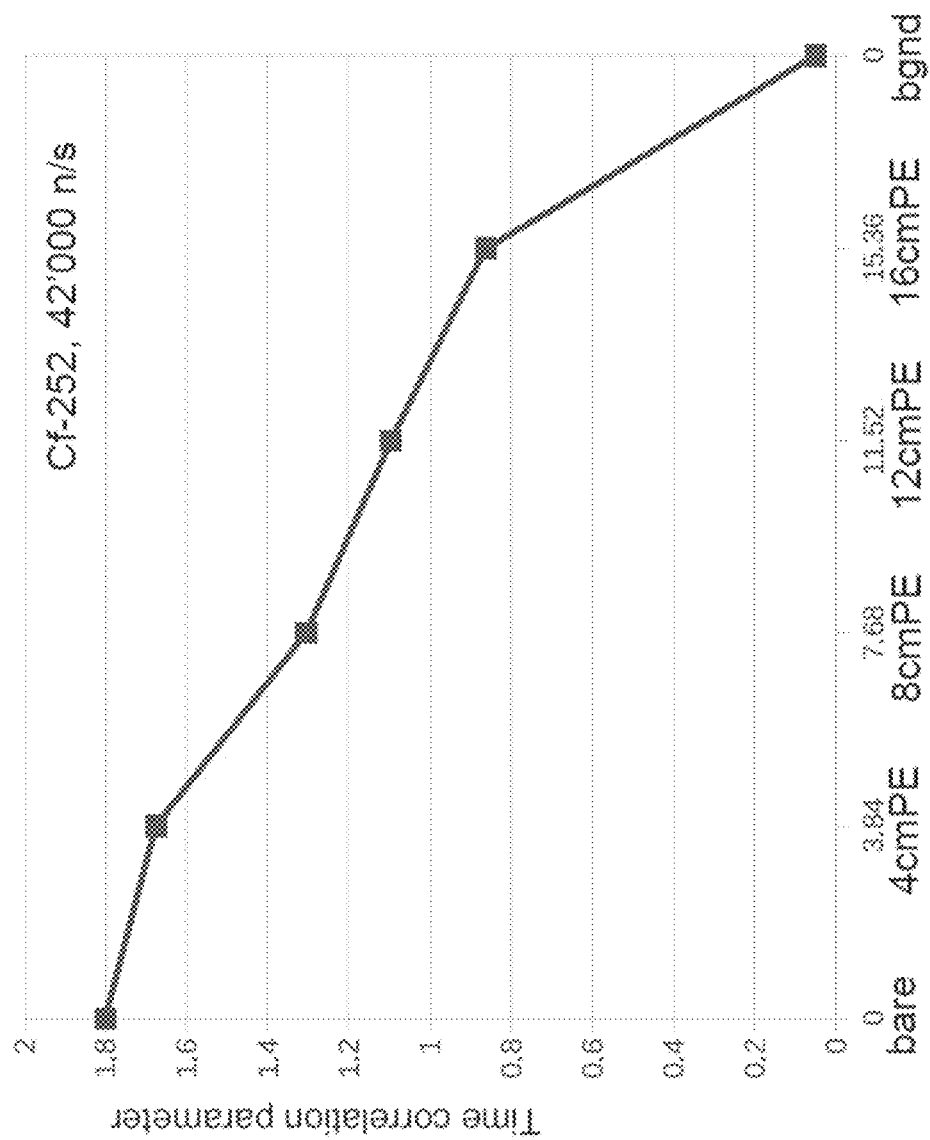
FIG. 16 shows a plot of actual measurements of the impact of neutron shielding on the time correlation parameter measured by the time analysis unit of an embodiment of this invention.

In FIG. 16, a plot of actual measurements shows the impact of neutron shielding on the time correlation parameter measured by the time analysis unit of an embodiment of this invention.

Figure 17:
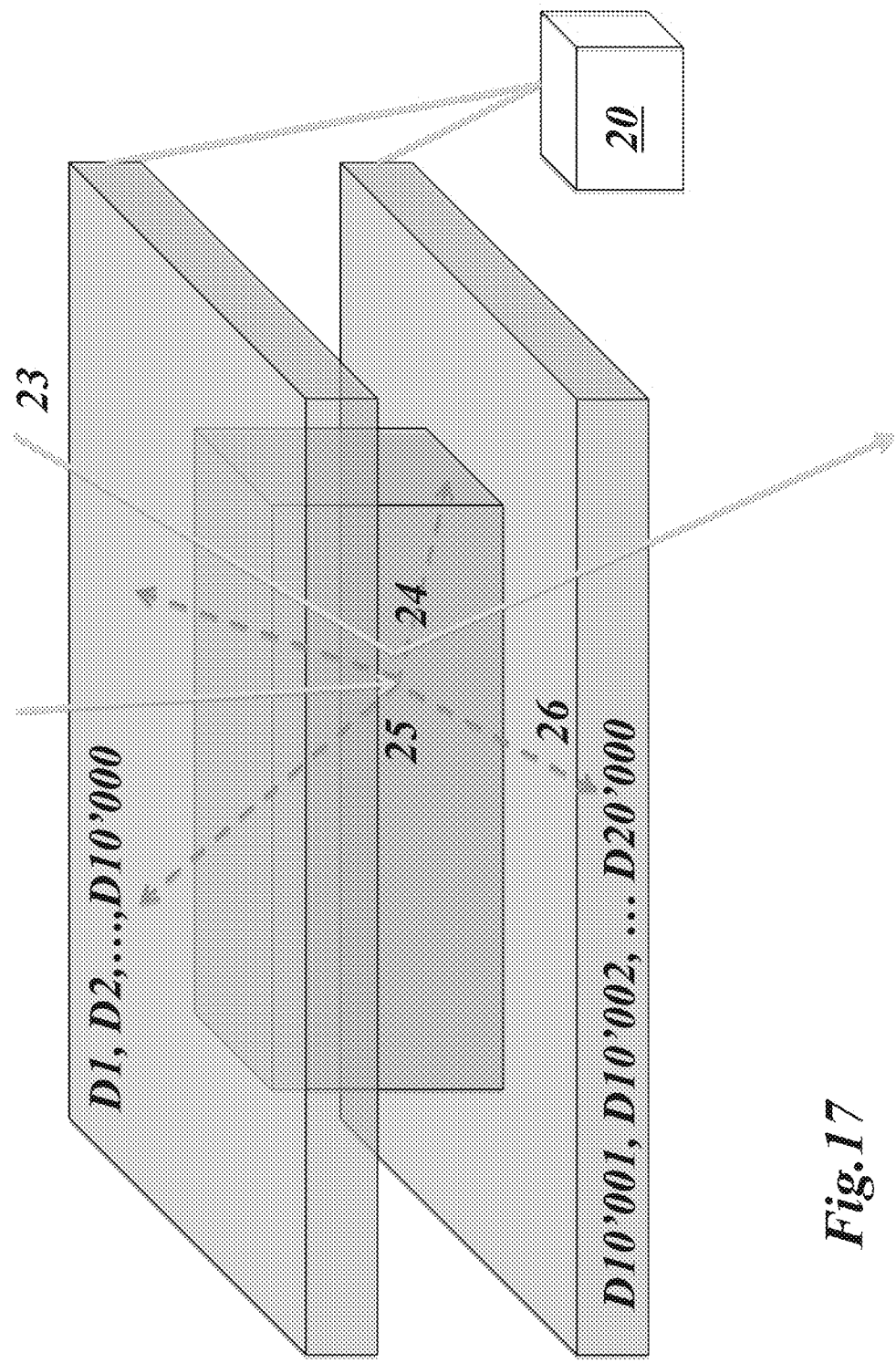
FIG. 17 shows a diagram of a possible embodiment of the invention applied to a muon scattering tomography system.

FIG. 17 shows an embodiment of the invention being applied to a muon scattering tomography system 22. The system has large arrays of detectors D'1, . . . D'20'000, typically proportional tubes, capable of measuring the trajectories of cosmic charged particles such as muons 23 as they pass through. The system measures the deflection 24 of muons in the container being monitored, to map the arrangement of dense and high-Z materials inside the container. Furthermore, the detector arrays passively detect radiation emitted from the cargo. In this embodiment, the timing information from the detectors is time stamped and analysed, with the purpose of detecting radiological and nuclear threats on the basis of their correlated emission of radiation, and discerning these sources from more benign sources of radiation. In a further embodiment of this invention, the arrays are used to detect cosmic radiation stopping events. Low energy muons have a probability of stopping in very dense materials 25 such as nuclear materials. When doing so, they have a probability of inducing fission in nuclear material. In such a muon-induced fission event, time correlated photons and neutrons 26 are emitted, detected by said detectors with time stamps showing a high degree of correlation.

Figure 18:
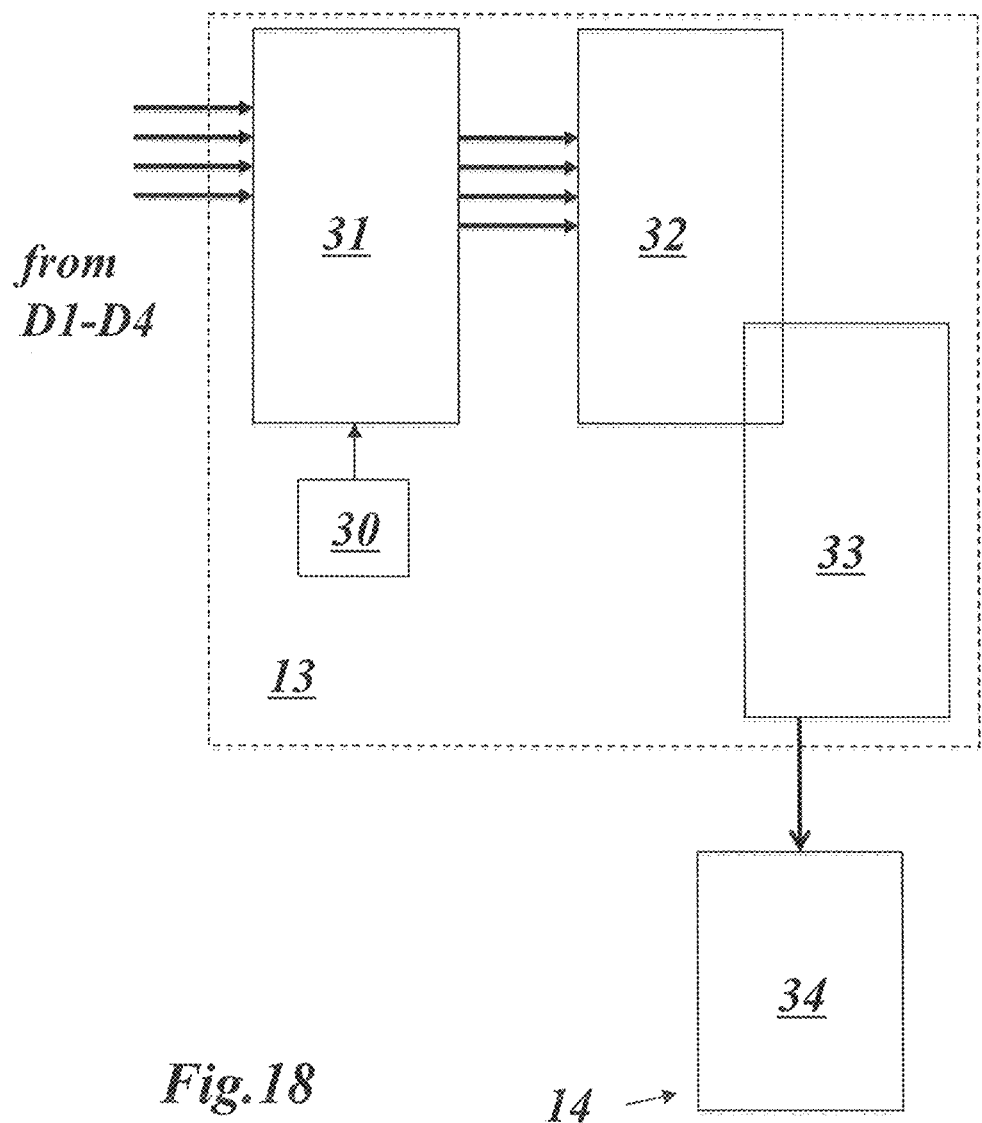
FIG. 18 shows an embodiment of the time stamping unit and time analysis unit in a system according to the invention.

FIG. 18 shows an embodiment of the time stamping unit 13 and time analysis unit 14 in a system according to the invention. The signals from the detectors D1-D4 are digitized by an analog to digital converter 31 that has a synchronized clock 30 over all channels. This digital data is then written to a storage device 32. A software program 33 analyses the digitized signals and determines the event time based on criteria such as time of signal peak, or time of crossing a determined threshold. In one embodiment, this event time is stored on a storage device. In another embodiment, the information is passed directly or written temporarily to memory. A software program 34 accesses the event time of each event and performs the time correlation analysis. In one embodiment of the invention, the software program 33 also saves other parameters such as event energy, location, particle type, or detector type to memory or hard drive, or passes it to the software program 34 via temporary storage. Software program 34 analyses not only the event time data, but also some of the other parameters stored for each event.

Figure 19:
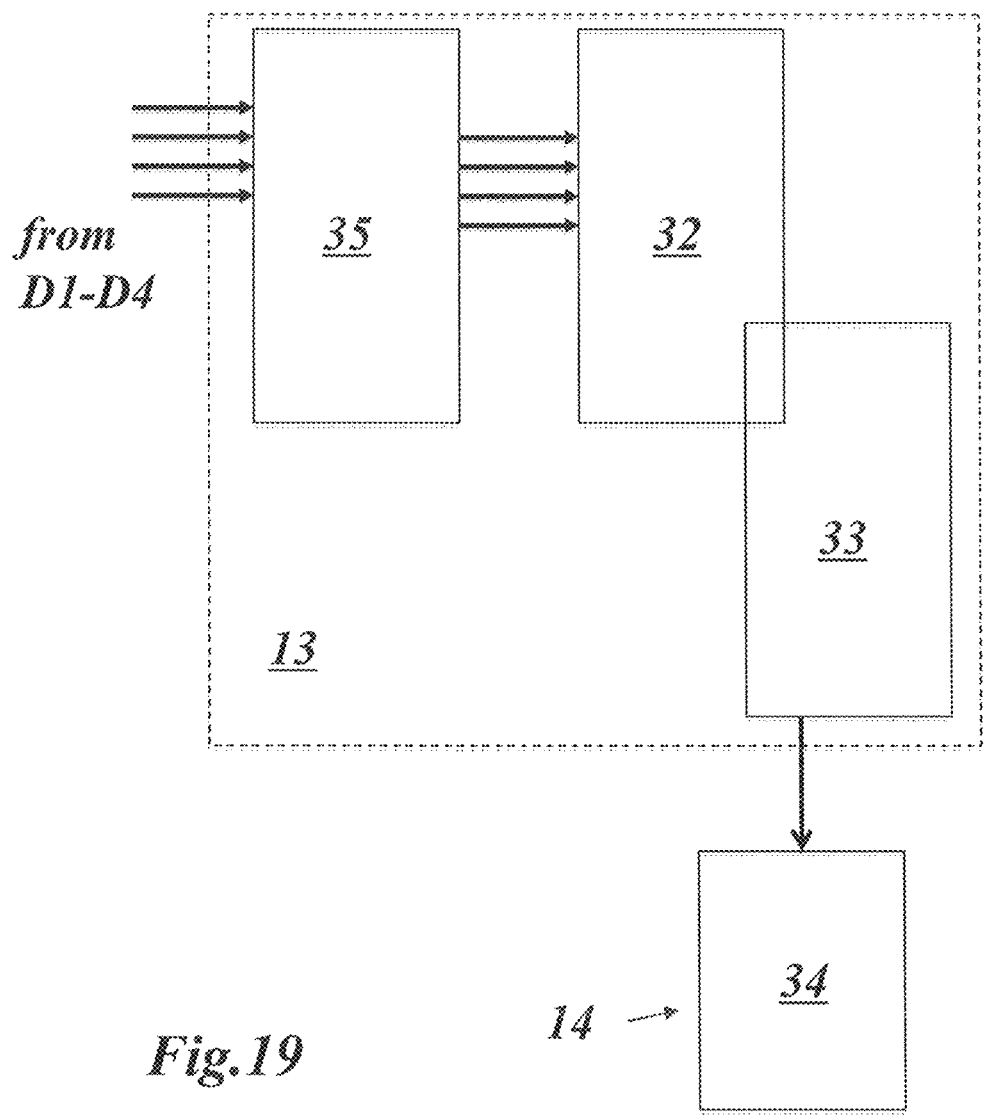
FIG. 19 shows an embodiment similar to FIG. 18, where signals are analyzed by a field programmable gate array FPGA.

FIG. 19 shows another embodiment, where signals are analyzed by a field programmable gate array FPGA 35, which extracts the event time and saves it to a storage device 32. The FPGA 35 may also extract other parameters such as event energy, location, particle type, or detector type, and save these to the storage device 32 or send them via a communications link to the program software 34.

What is claimed is:

1. A method for detecting, identifying and/or characterizing nuclear and/or radiological material in a container, vehicle, or on a person, which is part of a flow of traffic, goods, or pedestrians, and which is monitored, at places such as ports, border crossings, airports, nuclear facility perimeters, public events, public transport facilities, roads, bridges or tunnels, the method comprising the steps of:

(a) providing at least one detector of a given detector type, which is capable of detecting radiation events being interrelated to nuclear or radiological material;

(b) bringing said at least one detector in the vicinity of the container, vehicle or person to be monitored;

(c) detecting radiation events being interrelated to said container, vehicle or person to be monitored;

(d) providing timing information of the at least one detector to a time stamping unit, the time stamping unit assigning each detected radiation event an individual time stamp in order to generate a time pattern of the detected radiation events; and (e) passing an output of the time stamping unit to a time analysis unit, the time analysis unit analyzing said time pattern with respect to time correlation structures and, in order to identify a presence and/or a characteristic of the nuclear or radiological material, outputting measurement results in the form of one or more time correlation parameters of radiation emitted by the nuclear or radiological material in the container, vehicle, or on the person to be monitored and detected by the at least one detector of the given detector type, wherein the timing information from said at least one detector is fed to a time stamping unit or a time analysis unit after having been pre-processed by a signal processing unit.

2. The method according to claim 1, wherein said at least one detector is sensitive to photons in an energy range from about 40 keV to about 4 MeV, and/or fast neutrons in the energy range between about 100 keV and 3 MeV.

3. The method according to claim 2, wherein said at least one detector is a large area fast response radiation detector, especially with a sensitive area of 2000 cm², or more.

4. The method according to claim 2, wherein said at least one detector is a PVT plastic scintillator.

5. The method according to claim 1, wherein said at least one detector is part of an already existing radiation portal monitor or muon scattering tomography system.

6. The method according to claim 5, wherein:
said at least one detector comprises a scintillator; and
to obtain timing information of the detected radiation events, an optical signal is taken from the scintillator directly or via a light guide.

7. The method according to claim 5, wherein the timing information from said at least one detector is directly fed to a time stamping unit or a time analysis unit.

8. The method according to claim 1, wherein:
said at least one detector comprises a scintillator and a photomultiplier tube; and
to obtain timing information of the detected radiation events, a signal is directly taken from said photomultiplier tube.

9. The method according to claim 1, wherein the signal processing unit is a signal processing unit of an already existing radiation portal monitor.

10. The method according to claim 1, wherein, within the time analysis performed in step (e), the temporal distribution of the time stamps of detected radiation events during a measurement time is measured and compared with the temporal distribution of time stamps of radiation events expected when no threatening radiation source is present.

11. The method according to claim 1, wherein, within the time analysis performed in step (e), detected correlated counts for accidental coincidences are corrected by measuring the amount of accidental coincidences when no correlations from threatening radiation sources are expected.

12. The method according to claim 1, wherein, within the time analysis performed in step (e), detected correlated counts for accidental coincidences are corrected by measuring the gross count rates of said at least one detector and relating this value to the number of accidental coincidences.

13. The method according to claim 1, wherein, within the time analysis performed in step (e), the shape of neutron gamma coincidence events is measured in the time difference region corresponding to the time of flight difference between neutrons and photons and is used to predict the energy spectrum of the neutrons.

14. A method for detecting, identifying and/or characterizing nuclear and/or radiological material in a container, vehicle, or on a person, which is part of a flow of traffic, goods, or pedestrians, and which is monitored, at places such as ports, border crossings, airports, nuclear facility perimeters, public events, public transport facilities, roads, bridges or tunnels, the method comprising the steps of:

(a) providing at least one detector of a given detector type, which is capable of detecting radiation events being interrelated to nuclear or radiological material;

(b) bringing said at least one detector in the vicinity of the container, vehicle or person to be monitored;

(c) detecting radiation events being interrelated to said container, vehicle or person to be monitored;

(d) providing timing information of the at least one detector to a time stamping unit, the time stamping unit assigning each detected radiation event an individual time stamp in order to generate a time pattern of the detected radiation events; and (e) passing an output of the time stamping unit to a time analysis unit, the time analysis unit analyzing said time pattern with respect to time correlation structures and, in order to identify a presence and/or a characteristic of the nuclear or radiological material, outputting measurement results in the form of one or more time correlation parameters of radiation emitted by the nuclear or radiological material in the container, vehicle, or on the person to be monitored and detected by the at least one detector of the given detector type, wherein said at least one detector is connected to a signal processing unit, and that timing information of the detected radiation events is obtained by fitting an active or passive signal splitter device between said at least one detector and the signal processing unit.

15. A radiation monitoring arrangement comprising:
at least one detector, which is capable of detecting radiation events being interrelated to nuclear or radiological material to be detected, wherein said at least one detector is a PVT plastic scintillator;
a time stamping unit for assigning each detected radiation event of said at least one detector an individual time stamp, said time stamping unit having an input, which receives signals from said at least one detector in order to generate a time pattern of the detected radiation events;
a time analysis unit for receiving individual time stamps from the time stamping unit and for analyzing said time pattern with respect to time correlation structures in order to identify a presence and/or a characteristic of the nuclear or radiological material; and
an output being connected to the time analysis unit for outputting measurement results in the form of one or more time correlation parameters of radiation emitted by the nuclear or radiological material to be detected by the PVT plastic scintillator,
wherein the signals from said at least one detector are fed to a time stamping unit or a time analysis unit after having been pre-processed by a signal processing unit.

16. The radiation monitoring arrangement according to claim 15, wherein said at least one detector is sensitive to photons in an energy range from about 40 keV to about 4 MeV, and/or fast neutrons in the energy range between about 100 keV and 3 MeV.

17. The radiation monitoring arrangement according to claim 16, wherein said at least one detector is a large area fast response radiation detector, with a sensitive area of 2000 cm2, or more.

18. The radiation monitoring arrangement according to claim 15, wherein said at least one detector is part of a radiation portal monitor or muon scattering tomography system.

19. The radiation monitoring arrangement according to claim 18, wherein said at least one detector is connected within said radiation portal monitor to a signal processing unit.

20. The radiation monitoring arrangement according to claim 18, wherein said at least one detector is directly connected the input of said time stamping unit.

21. The radiation monitoring arrangement according to claim 18, wherein an output of said signal processing unit is connected to the input of said time stamping unit.

22. The radiation monitoring arrangement according to claim 15, wherein said time analysis unit is connected to a time correlation alarm decision unit.

23. The radiation monitoring arrangement according to claim 15, wherein said time stamping unit and said time analysis unit are contained in a box, and said box is arranged at a side of said a radiation portal monitor.

24. The radiation monitoring arrangement according to claim 15, wherein the time analysis unit analyzes the time pattern received from said time stamping unit with respect to time correlation structures of said at least one detector.

25. The radiation monitoring arrangement according to claim 15, wherein said at least one detector comprises a scintillator and a photomultiplier tube, and wherein a signal can be taken directly from said photomultiplier tube for obtaining timing information of the detected radiation events.

26. The radiation monitoring arrangement according to claim 15, wherein the time analysis unit is capable of the following: (a) measuring, within the time analysis, a temporal distribution of time stamps of detected radiation events during a measurement time; and (b) comparing the temporal distribution of time stamps of detected radiation events with a temporal distribution of time stamps of radiation events expected when no threatening radiation source is present.

27. A method for detecting, identifying and/or characterizing nuclear and/or radiological material in a container, vehicle, or on a person, which is part of a flow of traffic, goods, or pedestrians, and which is monitored, at places such as ports, border crossings, airports, nuclear facility perimeters, public events, public transport facilities, roads, bridges or tunnels, the method comprising the steps of:

(a) providing at least one detector of a given detector type, which is capable of detecting radiation events being interrelated to nuclear or radiological material;

(b) bringing said at least one detector in the vicinity of the container, vehicle or person to be monitored;

(c) detecting one or more radiation events comprising emission of a plurality of particles and being interrelated to said container, vehicle, or on the person to be monitored;

(d) assigning each detected radiation event an individual time stamp in order to generate a time pattern of the detected one or more radiation events, wherein each radiation event comprises radiation emitted by the nuclear or radiological material in the container, vehicle, or of the person to be monitored and detected by the at least one detector of the given detector type; and (e) analyzing said time pattern to identify a number of radiation events within one or more time separation windows of predetermined duration, and identifying a presence and/or a characteristic of the nuclear or radiological material based on a distribution of the number of radiation events in the one or more time windows, wherein signals from said at least one detector are fed to a time stamping unit or a time analysis unit after having been pre-processed by a signal processing unit.

28. A method for detecting, identifying and/or characterizing nuclear and/or radiological material in a container, vehicle, or on a person, which is part of a flow of traffic, goods, or pedestrians, and which is monitored, at places such as ports, border crossings, airports, nuclear facility perimeters, public events, public transport facilities, roads, bridges or tunnels, the method comprising the steps of:

(a) providing at least one detector, which is capable of detecting radiation events being interrelated to nuclear or radiological material, wherein said at least one detector is a PVT plastic scintillator, which is sensitive to photons in an energy range from about 40 keV to about 4 MeV, and/or fast neutrons in the energy range between about 100 keV and 3 MeV;

(b) bringing said at least one detector in the vicinity of the container, vehicle or on the person to be monitored;

(c) detecting radiation events being interrelated to said container, vehicle or on the person to be monitored;

(d) providing timing information of the at least one detector to a time stamping unit, the time stamping unit assigning each detected radiation event an individual time stamp in order to generate a time pattern of the detected radiation events; and (e) passing an output of the time stamping unit to a time analysis unit, the time analysis unit analyzing said time pattern with respect to time correlation structures and, in order to identify a presence and/or a characteristic of the nuclear or radiological material, outputting measurement results in the form of one or more time correlation parameters of radiation emitted by the nuclear or radiological material in the container, vehicle, or on the person to be monitored and detected by the at least one detector of the given detector type, wherein the timing information from said at least one detector are fed to a time stamping unit or a time analysis unit after having been pre-processed by a signal processing unit.

* * * * *

UNITED STATES PATENT AND TRADEMARK OFFICE
CERTIFICATE OF CORRECTION

PATENT NO. : 10,078,151 B2
APPLICATION NO. : 13/913966
DATED : September 18, 2018
INVENTOR(S) : Rico Chandrasekharan et al.

Page 1 of 1

It is certified that error appears in the above-identified patent and that said Letters Patent is hereby corrected as shown below:

In the Claims

Column 13, Line 4, Claim 17, delete "cm2," and insert -- $cm^2$, --

Column 13, Line 15, Claim 20, after "connected" insert -- to --

Signed and Sealed this
Fifteenth Day of January, 2019

Andrei Iancu
*Director of the United States Patent and Trademark Office*